April 17, 1962 E. MADLUNG 3,029,809
BRUSH FOR EDENTULOUS MOUTH
Filed May 13, 1960

INVENTOR.
Esther Madlung
BY
Byron, Hume, Groen & Clement
Attys.

United States Patent Office 3,029,809
Patented Apr. 17, 1962

3,029,809
BRUSH FOR EDENTULOUS MOUTH
Esther Madlung, 2331 Olive St., Blue Island, Ill.
Filed May 13, 1960, Ser. No. 28,958
4 Claims. (Cl. 128—62)

This invention relates to an article of manufacture which may be utilized to clean, brush, and massage the tissue of an edentulous or partially edentulous mouth.

The maintenance of a high standard of hygiene in the oral cavity or mouth is equally as important for the edentulous as for the dentulous mouth. Harmful bacteria and other deposits normally found in the edentulous mouth collect along the gum surfaces, and to an accentuated degree with artificial dentures. Inasmuch as disease may result or unpleasant breath occur, it is important to remove harmful deposits and bacteria from the gum tissue as well as (and possibly more important) to maintain the gum tissue in a proper tone.

It is a matter of little dispute that massaging of the gums, whether it be in an edentulous or dentulous mouth, increases the circulation of blood through the gum tissue, thereby aiding in the removal of fatigue products in the circulation system and increasing the flow of proper nutrients into the massaged area. More blood flows into the gum tissue during and after massaging and thereby aids in the proper maintenance of a healthy mouth.

Massaging is generally classified into four types (1) stroking, (2) kneading, (3) rubbing, and (4) tapping. Of these four types of massaging, stroking and rubbing can be best applied to the gum tissues in the mouth. Rubbing may be described as comprising an abrasive action between two opposed surfaces while stroking is a more gentle action, whereby two surfaces are drawn past one another, so that various portions of both surfaces are not in contact with each other during portions of the stroke.

The undesirability of massaging by rubbing, especially on gum tissue, is readily perceived, since rubbing also has an excessive abrasive effect which will, and can, add displeasure and may actually provide gum tissue damage.

However, if the massage is applied in the form of stroking, then the gum tissues are stimulated gently and without the adverse effects which may be produced by rubbing. The beneficial effects provided by stroke massaging may be further supplemented by cleansing the massaged area with selected medicaments or dentifrices.

It is therefore a principal object of my invention to provide a device which stroke massages the gum tissues of an edentulous mouth.

Another object of my invention is to provide a device which may be utilized to not only stroke massage the gum tissues of an edentulous mouth, but also to clean the gum tissues at the same time.

It is another object of this invention to provide a device which is of such a physical construction that the gum tissue of an edentulous mouth can be stroke massaged and which contains medicaments and dentifrices which will clean the massaged gum tissue at the same time.

It is another object of the invention to provide a device which may be used to stroke massage substantially the entire gum tissue ridge of an edentulous mouth.

It is another object of my invention to provide a device which can be readily utilized to simultaneously stroke massage opposing slopes of the gum tissue ridge of an edentulous mouth.

Further objects and features of my invention pertain to the particular structure and arrangements whereby the above-identified and later-introduced objects of the invention are obtained.

The invention both as to its structure and method of usage will be better understood by reference to the following and in view of the drawings forming a part thereof, wherein.

Figure 1:
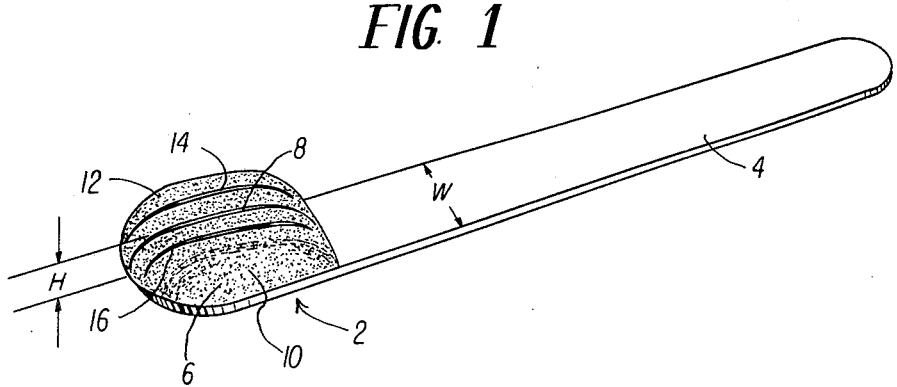
FIGURE 1 is a perspective view of one embodiment of my invention.

Referring now to the drawings, like numerals designating corresponding parts in all figures of the drawing are used. The numeral 2 denotes generally the gum massager illustrated in the disclosed embodiment of my invention. Gum massager 2 is comprised of a manipulating handle 4 of an elongated design to facilitate the proper handling thereof while in the control of the user. Attached to one end of the manipulating handle 4 by any convenient means, such as gluing or the like, is massaging pad 6. Pad 6 has a groove 8 formed therein in substantially the median plane intermediate the planes containing the sides 10 and 12 of pad 6. Intermediate the groove 8 and side 12 of pad 6 is formed slot 14, and intermediate the groove 8 and side 10 is formed slot 16.

Massaging pad 6 may be comprised of cellular type soft foam which is capable of retaining a reservoir of liquid for use when desired. It is also desirable that massaging pad 6 be formed of a material which will not react with the reservoir of stored liquid in any manner either chemically or by solvent action. This is readily understood, since when a medicament is chosen, it is always desirable that the medicament be applied in the selected form and free from all contaminants. Polyurethane foams have been developed, and are on the market, which will provide this necessary attribute. The longitudinal dimension of massaging pad 6 as viewed in FIGURE 1 can be of the same order as that of toothbrush bristles. Variations in the longitudinal length of the massaging pad 6, if kept approximately the size of the longitudinal length of toothbrush bristles, will not be critical.

Groove 8 is of a critical height or depth dimension, as viewed in FIGURE 1 with H representing the height, or depth, of the groove 8. The depth of the groove 8 must be such that when the massaging pad 6 is placed over the gum tissue ridge of the edentulous or partially edentulous or partially edentulous mouth, opposite walls of the massaging pads 6 forming the groove 8 will ride upon and substantially cover the entire area of the opposite slopes forming the gum tissue ridge in the edentulous or partially edentulous mouth. If the depth or height of the groove 8 is too shallow, the massaging pad 6 will ride substantially on the top of the gum tissue ridge and will produce a rubbing type of massaging action which will cause undesirable heating as well as objectionable abrading of the gum tissues.

Grooves 14 and 16 which are formed on opposite sides of groove 8 perform the function of permitting the portion of the massaging pad 6 intermediate grooves 8 and 14, and 8 and 16, respectively, to more readily move away from the median axis 3—3 of the gum massager 2 when the gum massager 2 is in use.

It can be seen that slots 14 and 16 need not be as deep or have a dimension equivalent to the dimension H in slot 8, since the movement of the material intermediate slots 8 and 14, and 8 and 16, respectively, is greater on the top surface of the massaging pad 6 as viewed in FIGURE 1 than at points below the top surface, as can be readily understood. The width dimension W of the manipulating handle 4 and the massaging pad 6 may be approximately the same. The width of the massaging pad 6 must be sufficient to enable the walls forming groove 8 to have a degree of resiliency, as will be more clearly understood hereinafter.

Figure 2:
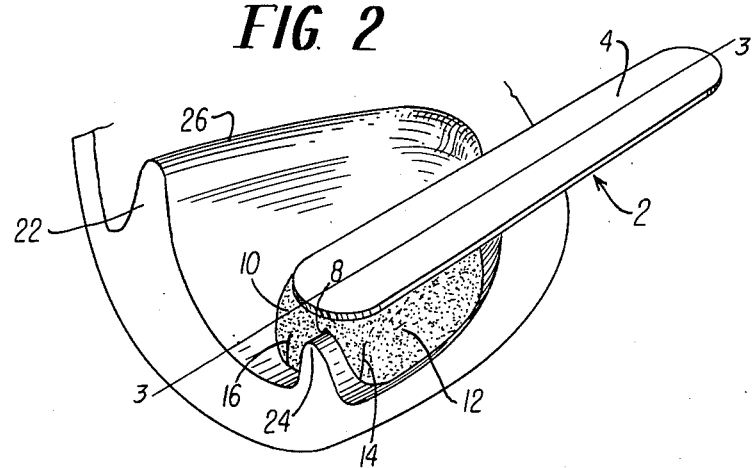
FIGURE 2 is a perspective view illustrating the use to which the embodiment of my invention illustrated in FIGURE 1 can be applied.

Referring now to FIGURE 2, wherein the use of one embodiment of my invention is illustrated, FIGURE 2 illustrates, for purposes of convenience, the gum tissue ridge 22 formed on the bottom of the mouth of an edentulous patient, or user. First, the massaging pad 6 may be filled with a medicament, which may be a powder or liquid which is desired to be applied to the gum tissue. The medicament may be inserted by any method, and if a liquid by dipping the massaging pad 6 into the liquid, or pouring the liquid over the massaging pad 6, or any other means which is appropriate to the circumstances. If the medicament is a powder, it may be poured onto the massaging pad 6. The massaging pad 6 is then inserted into the mouth of the user, and is under the control of the manipulating handle 4. The groove 8 of the massaging pad 6 is placed over and upon the upper ridge 24 of the gum tissue ridge 26. Downward pressure is then applied by the user through the manipulating handle 4 and the massaging pad 6 is moved over either slope of the gum ridge 26 so that the surfaces of massaging pad 6 forming the groove 8 lie adjacent to and resiliently positioned with respect to the opposite slopes of the gum tissue ridge 26.

At this time, any liquid medicaments which have been stored in the reservoir of the massaging pad 6 will flow onto the gum tissue 26, due to portions of the massaging pad 6 being compressed.

From FIGURE 2, it is obvious that the depth of the groove 8 must be such that the gum tissue ridge 26 is substantially surrounded by the massaging pad 6. It should be apparent now that the width of the massaging pad 6 must be sufficient to offer enough resistance so that the walls forming the groove 8 of the massaging pad 6 will resiliently ride upon the slopes forming the gum tissue ridge 26.

The gum ridge 26 is cleansed and massaged by pulling the massaging pad 6 back and forth over ridge 26. By this procedure, medicaments are expelled from the massaging pad 6 and also the massaging pad 6 strokes opposite sides of the gum tissue ridge 26, increasing the circulation in the gum tissue and without undue heat or abrasion. The walls forming the groove 8 of pad 6 will not merely slide over the slopes on opposite sides of the gum ridge, but will randomly adhere to portions of the slopes of the gum ridge, resulting in a caterpillar type movement, thus providing the gentle stroking action and its beneficial effects. The massaging pad 6 must therefore be formed of a soft foam which is highly resilient in order to perform the aforementioned functions.

Also, since polyurethane foam is utilized in the preferred embodiment of my invention, the medicament applied to the gum tissue will be dispensed in a relatively uncontaminated form, and also since the toughness of polyurethane is higher than other materials capable of retaining a liquid, the massaging pad 6 can be expected to have a long life.

The massaging pad 6 has provided satisfactory results when the overall dimensions have been 1⅜-inches in length by ¾-inch in width and by ½-inch in height, with the width dimension corresponding to "W" in FIGURE 1. Also the softness or resiliency of the polyurethane foam should be of the same order as that of a foam which would be used to apply powder to the face.

What has been disclosed is what is believed to be the best embodiment of the inventive concept, and the applicant is entitled to not only the specific structure illustrated expressing that concept, but the entire structural concept conveyed to a person skilled in the art.

What is claimed is:

1. For use in cleaning and massaging the gum tissue ridge of an edentulous mouth, a gum massager comprising a manipulating handle, a pad of resilient absorbent material having a first surface thereof secured to one end of said manipulating handle, said pad of resilient absorbent material being of a thickness substantially that of the height of said gum tissue ridge, said pad having a longitudinally extending groove formed in the exposed surface thereof, the walls of said groove normally extending into approximately abutting relationship, said groove being of a depth approximating the thickness of said pad whereby both slopes forming said gum tissue ridges have positioned adjacent thereto a portion of said walls of resilient absorbent material forming said groove.

2. For use in cleaning and massaging the gum tissue ridge of an edentulous mouth, a gum massager comprising a manipulating handle, an elongated pad of resilient foam material having a first surface thereof secured to one end of said manipulating handle, said pad of resilient foam material being of a thickness substantially that of the height of said gum tissue ridge, said pad having a longitudinally extending groove formed in the exposed surface thereof, the walls of said groove extending into approximately abutting relationship, a pair of secondary grooves formed in the exposed surface of said pad and straddling said first mentioned groove, said first mentioned groove being of a depth approximating the thickness of said pad whereby both slopes forming said gum tissue ridge have positioned adjacent thereto a portion of said walls of resilient foam material forming said first mentioned groove.

3. The gum massager of claim 2 further characterized in that said secondary grooves are of a depth substantially less than the depth of said first mentioned groove.

4. For use in cleaning and massaging the gum tissue ridge of an edentulous mouth, a gum massager comprising a manipulating handle, a pad of resilient foam material secured to one end of said manipulating handle, said pad being capable of retaining a reservoir of liquid, said pad of resilient foam material being of a thickness substantially that of the height of said gum tissue ridge, a longitudinally extending groove formed in the surface of said pad opposite said first mentioned surface, the walls of said groove extending into approximately abutting relationship, a second and third groove symmetrically positioned with respect to said first mentioned groove, the depth of said first mentioned groove approximating the thickness of said pad but being slightly less than the thickness thereof whereby both slopes forming the ridge of said gum tissue ridge have positioned adjacent thereto, over a substantial area thereof, portions of the resilient foam material forming said walls of said first mentioned groove of resilient foam material when in use, the depth of each of said second and third grooves being substantially less than the depth of said first mentioned groove.

References Cited in the file of this patent

UNITED STATES PATENTS

| 1,729,167 | Knapp | Sept. 14, 1929 |
| 1,924,337 | Troupa | Aug. 29, 1933 |
| 2,253,210 | Psiharis | Aug. 19, 1941 |
| 2,614,556 | Staunt | Oct. 21, 1952 |

FOREIGN PATENTS

| 255,918 | Switzerland | Feb. 1, 1949 |